(12) United States Patent
Pasanen et al.

(10) Patent No.: US 6,631,189 B2
(45) Date of Patent: Oct. 7, 2003

(54) METHOD AND SYSTEM FOR THE MANAGEMENT OF A V5 INTERFACE

(75) Inventors: Teppo Pasanen, Vantaa (FI); Susanna Virtanen, Vantaa (FI); Sami Kivilaakso, Veikkola (FI)

(73) Assignee: Nokia Corporation, Espoo (FI)

( * ) Notice: Subject to any disclaimer, the term of this patent is extended or adjusted under 35 U.S.C. 154(b) by 315 days.

(21) Appl. No.: 09/854,058

(22) Filed: May 11, 2001

(65) Prior Publication Data
US 2002/0126826 A1 Sep. 12, 2002

Related U.S. Application Data

(63) Continuation of application No. PCT/FI99/00946, filed on Nov. 15, 1999.

(30) Foreign Application Priority Data

Nov. 17, 1998 (FI) .................................................. 982487

(51) Int. Cl.$^7$ .............................. H04M 7/00; H04J 3/12
(52) U.S. Cl. .................. 379/229; 379/220.01; 370/522
(58) Field of Search ............................... 379/229, 230, 379/219, 220.01, 221.01; 370/351, 352, 522

(56) References Cited

U.S. PATENT DOCUMENTS 5,822,420 A 10/1998 Bolon et al. ................ 379/230
6,252,955 B1 * 6/2001 Antila et al. ................ 379/219

FOREIGN PATENT DOCUMENTS

| EP | 0 792 079 | 8/1997 |
| WO | WO 97/35404 | 9/1997 |
| WO | WO 99/13657 | * 3/1999 |
| WO | WO 99/65187 | 12/1999 |

OTHER PUBLICATIONS

International Search Report for PCT/FI99/00946.

* cited by examiner

Primary Examiner—Benny Tieu
(74) Attorney, Agent, or Firm—Squire, Sanders & Dempsey L.L.P.

(57) ABSTRACT

Method and system for managing the signalling software of a V5 interface connecting a first network element and a second network element in a system comprising a management network connected to the first and second network elements. According to the invention, a parameter set containing at least one parameter controlling a given function in the signalling software of the V5 interface is generated, and a parameter set corresponding to the parameters of the V5 interface in question is selected as the active parameter set to be used to control the operation of the signalling software.

12 Claims, 2 Drawing Sheets

METHOD AND SYSTEM FOR THE MANAGEMENT OF A V5 INTERFACE

Figure 1:
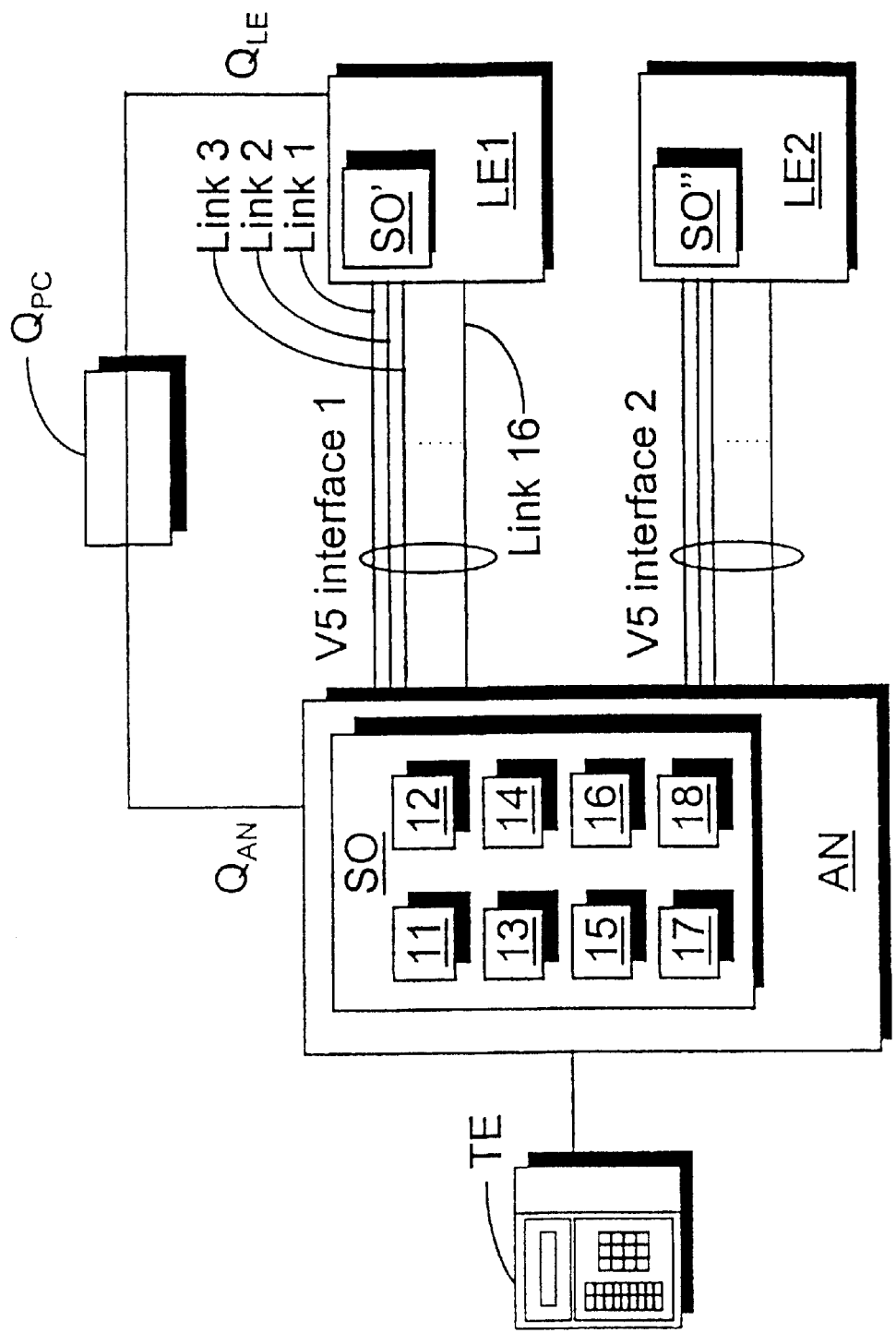

This is a continuation of international application Ser. No. PCT/FI99/00946 filed Nov. 15, 1999.

The present invention relates to a methods as defined in the preamble of claim 1 and to a system as defined in the preamble of claim 7 for the management of V5 interface signalling software.

BACKGROUND OF THE INVENTION

A previously known technique is to connect two network elements to each other via a V5 interface. Open interfaces (V5.1 and V5.2) between an access network or access node and a local exchange are defined in the ETSI (European Telecommunications and Standards Institute) standards. V5 interfaces enable subscribers belonging to a physically separate, wired or wireless access network to be connected using a standard interface of a telephone exchange.

A dynamic concentrator interface (V5.2) consists of one or more (1–16) PCM (Pulse Code Modulation) lines. One PCM line comprises 32 channels or time slots, each of which with a transfer rate of 64 kbit/s, i.e. 2048 kbit/s altogether. The V5.2 interface supports analogue telephones as used in the public telephone network, digital, such as ISDN (Integrated Services Digital Network) basic rate and primary rate access lines as well as other analogue or digital terminal equipment based on semi-fixed connections.

A static multiplexer interface V5.1 consists of one 2048 kbit/s PCM line. Except for the ISDN primary-rate access, the V.51 interface supports the same subscriber types as the V.52 interface.

The signalling between the network elements of the V5 interface is controlled by signalling software.

Older versions of the V5 standards contain many imperfections which have been interpreted in different ways by different manufacturers. Therefore, implementations produced by different manufacturers are not completely compatible. Many properties are more closely defined as the standards are developed further, and even completely new properties are often created. For this reason, the older implementations may drift still further apart, so they will not necessarily understand each other. Likewise, new versions of the standards may appear, in which it is necessary to implement a support for new properties in an easy way.

The object of the present invention is to improve prior-art solutions and to disclose a new type of method and system for connecting network elements consistent with V5 standards to each other so as to form a compatible interface between different applications and interpretations of the standards.

BRIEF DESCRIPTION OF THE INVENTION

The present invention concerns a method for the management of V5 interface signalling software in a telecommunication system comprising a first and a second network element connected by a V5 interface. Both ends of the V5 interface are provided with signalling software which takes care of the information sent and received in the network element in question. Moreover, the telecommunication system comprises a management network connected to the first and second network elements, which functions as a user interface between the V5 interface and the world outside and which is used to define the properties of the V5 interface.

According to the invention, a set of parameters is created, and a parameter set corresponding to the parameters of the V5 interface in question is selected as the active set used to control the operation of the signalling software. The parameter set contains at least one parameter controlling a given function in the V5 interface signalling software.

The generation of parameter sets and selection of the active parameter set to be used by the signalling software can be accomplished using the MML command language (MML, Man-Machine Language) via the management network. The active parameter set can also be selected from among parameter sets stored before-hand. If the stored parameter sets do not include an exactly suitable set, then the stored parameter sets can be modified to suit the V5 interface in question.

In an embodiment of the method, parameter sets consistent with standard V5 interfaces are generated and stored in conjunction with the signalling software. Each parameter set can be named with a separate identifier.

Moreover, the invention concerns a system for the management of V5 interface signalling software in a telecommunication system as described above. According to the invention, the signalling software of a V5 interface comprises means for generating, storing and activating a parameter set. The parameter set contains at least one parameter controlling a given function in the signalling software.

In addition, the system of the invention preferably comprises means for generating a parameter set and for selecting an active parameter set for use by the signalling software using the MML command language via a management network. Moreover, the signalling software may comprise means for selecting an active parameter set from among a number of parameter sets stored beforehand. The system preferably also comprises means for modifying stored parameter sets so as to make them consistent with the V5 interface in question. If the stored parameter sets do not include an exactly suitable set, then the stored parameter gets can be modified to make them consistent with the V5 interface in question.

In an embodiment of the invention, the signalling software comprises means for modifying a parameter set stored beforehand so as to make it consistent with the V5 interface in question. Further, in a preferred embodiment, the signalling software comprises means for generating parameter sets consistent with the standard versions of V5 interfaces and for storing them in conjunction with the signalling software. The signalling software may also comprise means for naming each parameter set with an individual identifier.

The invention improves the compatibility of different standard versions of the V5 interface and accelerates many Functions of the interface. The invention makes it possible to match network elements by the use of an appropriate parameter set without making changes in the software. In addition, the parameter set is easy to use and changes can be easily made.

LIST OF ILLUSTRATIONS

Figure 2:
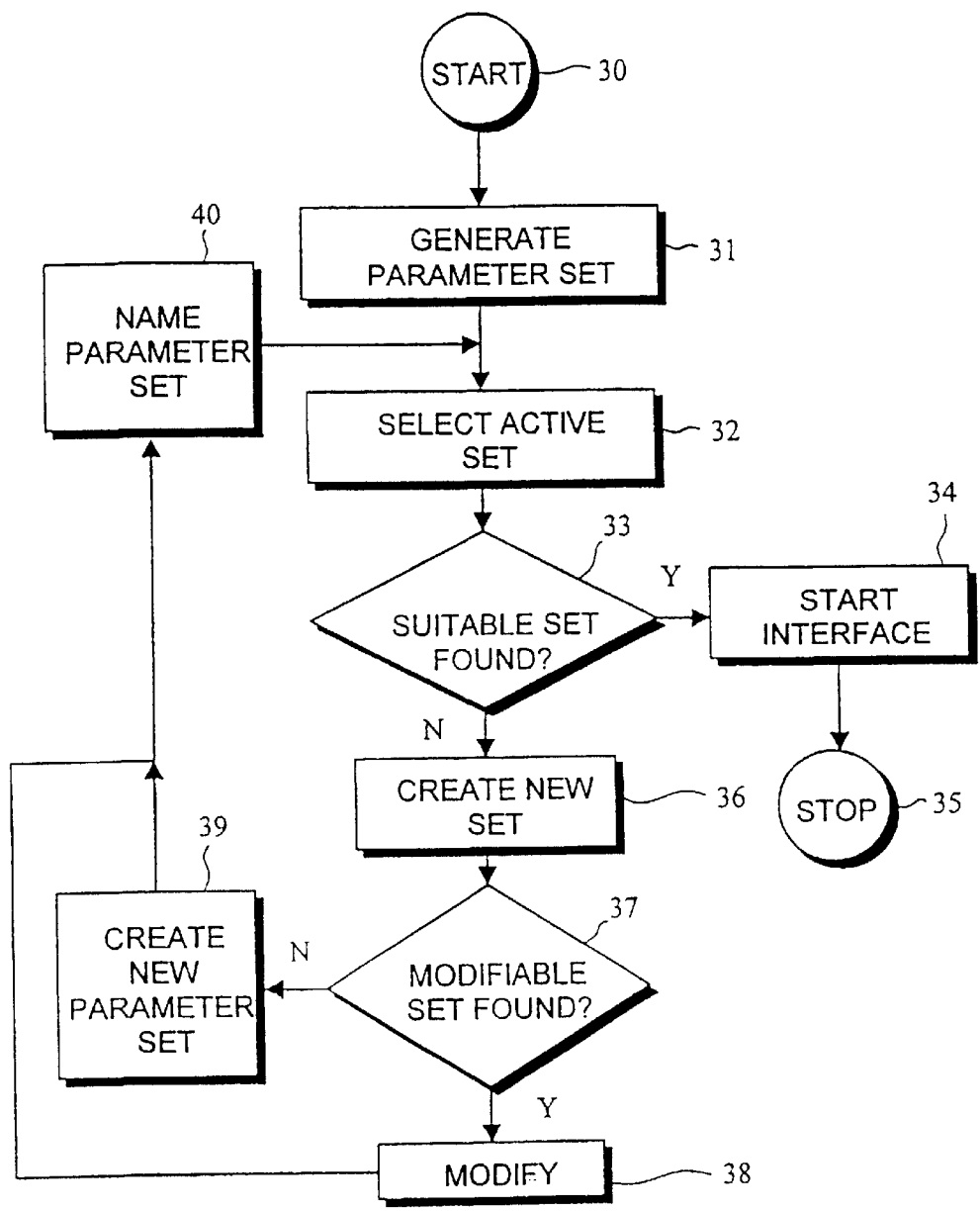

In the following, the invention will be described in detail by the aid of a few examples of its embodiments with reference to the attached drawing, wherein FIG. 1 presents a preferred embodiment of the system of the invention; and FIG. 2 is a flow diagram representing an embodiment of the method of the present invention.

DETAILED DESCRIPTION OF THE INVENTION

FIG. 1 presents a diagrammatic example of the system of the present invention. The system comprises a subscriber terminal TE connected to an access node AN, which is further connected via V5 interfaces to local exchanges LE1 and LE2. In an embodiment, the local exchanges LE1, LE2 are DX220 exchanges manufactured by Nokia and the access node AN is a DAXnode 5000 manufactured by Nokia. The access node is connected to local exchange LE1 via a V5 interface whose interface identifier is 1. This interface comprises 16 links formed using 2 Mbit/s PCM lines. In addition, the access node is connected to local exchange LE2 via a V5 interface whose interface identifier is 2. Each interface may comprise 1–16 links, and each link has an identifier which is unique in only one interface, whereas the identifier of the V5 interface is unique in the entire telecommunication network. FIG. 1 highlights certain essential parts of the system by way of example, but the description does not limit the invention with regard to this particular configuration. The system may comprise several different network components connected via different interfaces.

Each end of each V5 interface is provided with an aggregate of signalling software SS. These software aggregates take care of the signalling between the network elements AN, LE1, LE2. In certain respects, the signalling software aggregate SS of the access node, the signalling software aggregate SS' of the local exchange LE1 and the signalling software aggregate SS" of the local exchange LE2 may differ from each other. The signalling software SS comprises means 11 for generating a parameter set controlling the operation of the V5 interface and means 12 for the storage of the parameter set. The parameter set consists of at least one parameter controlling a given function in the signalling software. The signalling software SS also comprises means 13 for activating a parameter set corresponding to the parameters of the V5 interface in question. As stated above, in the case of FIG. 1, these parameters are determined according to the local exchanges LE1 and LE2 and they may be different for each one of the two V5 interfaces, V5 interface 1 and V5 interface 2.

Said means 11, 12, 13 are part of each software aggregate SS, although in FIG. 1 they are only shown in conjunction with the signalling software of the access node AN. The ways in which the above-mentioned means 11, 12, 13 can be implemented in the network elements referred to, e.g. using suitable program blocks, are obvious to the skilled person. Therefore, the details of their practical implementation will be omitted in this description.

The access node AN is provided with a management interface $Q_{AN}$, and local exchange LE1 is provided with a management interface $Q_{LE}$. These network elements AN, LE1 can be controlled via the management interfaces $Q_{AN}$, $Q_{LE}$ by means of management network $Q_{PC}$. The interfaces and structures of the management interfaces are defined in the standards. The signalling software SS comprises means 14 for generating a parameter set and for activating a parameter set by using the MML command language (MML, Man Machine Language) via the management network ($Q_{PC}$). In the signalling software, it is possible to form a number of different parameter sets corresponding to different V5 interfaces. Using means 15, one of the parameter sets generated beforehand is selected as an active parameter set, and consequently the parameters in the selected parameter set control the interface in question.

In some cases, the parameters for the V5 interface are modified so that the new parameter set does not completely correspond to a parameter set stored beforehand. Similarly, a new V5 interface may differ only a little from a V5 interface consistent with a stored parameter set. Using means 16 in the signalling software, a parameter set stored beforehand can be modified so that the parameters correspond to the active V5 interface. Thus, room an existing model formed by a parameter set, a new functional parameter set can be generated.

There are several different standard versions and practical applications of the V5 interface. Using means 17 in the signalling software, parameter sets corresponding to different standard versions are generated and stored in conjunction with the signalling software SS. Using means 18 in the signalling software, each one of the parameter sets stored beforehand is named with an individual identifier. The identifier makes it easy to find the right parameter set; the identifier may resemble the name of the network component connected to one end of the V5 interface. In a preferred embodiment, instead of displaying all the parameters, only the identifier of the parameter set is displayed for the user, so the user can easily select the right parameter set stored beforehand. Some of the parameters may be left visible e.g. for testing purposes.

In an embodiment according to FIG. 1, the transmission link protocol used is the LAPV5 protocol (LAPV5, Link Access Protocol for V5 -interface) based on the LAPD protocol (LAPD, Link Access Protocol for ISDN D-channel). The LAPV5 protocol is used e.g. in the SSU (SSU, Subscriber Stage controller Unit) of the DX220 exchange.

In the following, a preferred embodiment of the present invention will be described with reference to FIG. 1. The states of the access ports of the network elements AN, LE1, LE2 may be OPERATIONAL or BLOCKED, i.e. available or unavailable. In the example, local exchange LE1 is so implemented that its access port is in the BLOCKED state when it is initially started up, whereas the access node AN is so implemented that its access port is in the OPERATIONAL state at startup. To save the time spent in checking the access port states and sending unnecessary signalling between the elements, a parameter which changes the access port of the access node into the BLOCKED state is included in the stored parameter set. This parameter can be input into the system e.g. by giving a command in the MML command language (MML, Man Machine Language) via the management network $Q_{PC}$.

The signalling software aggregates SS read the parameters of the parameter set selected as the active set and function accordingly. In the example, both access ports are in the BLOCKED state at the initial startup. The number of parameters stored in the parameter set is not limited. Therefore, it is also possible to store other parameters in the parameter set, such as:

symmetry of Restart procedure, use of Restart procedure at initial startup, accelerated unblocking of ports/port-specific unblocking, re-provisioning send Disconnect complete message at startup (yes/no), release resources in case of link failure (internal release/ no)

fault in PSTN-DL prevents startup of interface (yes/no).

If the software in any one of the network elements is updated with a version having new properties, then the new properties can be made functional at the other end of the V5 interface as well by modifying or changing the parameter set.

FIG. 2 presents a flow diagram representing a preferred method according to the invention. First, a parameter set is generated, block 31, in which some of the parameters mentioned above can be stored as needed. Next, an active set is selected based on the traffic type and network elements to be used, block, 32. In conjunction with the selection, a check is carried out to establish whether a suitable parameter set for the case at hand can be found, block 32. If a suitable set is found, then the interface is started using the parameters defined in it, block 34. If no suitable parameter set is found in block 33, then a new parameter set is created via the management network, block 36. At this stage a check can be carried out, block 37, to determine whether a parameter set can be found that could be easily modified to form a new set. If such a set is found, then the procedure goes on to block 38 and the set is modified. After that, the parameter set is assigned a name, block 40, and action is resumed from block 32 to select an active set. If in block 37 no suitable set for modification is found, then the procedure goes on to block 39 and a completely new parameter set is generated. After that, the new parameter set is given a name, block 40, and action is resumed from block 32, where this set is selected as the active set.

The invention is not restricted to the examples of its embodiments described above, but many variations are possible within the scope of the inventive idea defined in the claims.

What is claimed is:

1. Method for managing the signalling software (SS) of a V5 interface (V5) connecting a first network element (LE) and a second network element (AN) in a system comprising a management network ($Q_{pc}$) connected to the first and second network elements, characterized in that
    a parameter set is generated which contains at least one parameter controlling a given function in the signalling software (SS) of the V5 interface (V5); and a parameter set corresponding to the parameters of the V5 interface in question is selected as an active parameter set to be used to control the operation of the signalling software.

2. Method as defined in claim 1, characterized in that the active parameter set is generated and selected for use in the signalling software (SS) by using the MML command language via the management network ($Q_{pc}$).

3. Method as defined in claim 1, characterized in that the active parameter set is selected from among parameter sets stored beforehand.

4. Method as defined in claim 1, characterized in that a parameter set stored beforehand is modified to make it consistent with the V5 interface (V5) in question.

5. Method as defined in claim 1, characterized in that parameter sets consistent with standard versions of V5 interfaces (V5) are generated and stored in conjunction with the signalling software (SS).

6. Method as defined in claim 1, characterized in that each parameter set is named with an individual identifier.

7. System for the management of the signalling software (SS) of a V5 interface (V5) connecting a first network element (LE) and a second network element (AN) in a system comprising a management network ($Q_{pc}$) connected to the first and second network elements, characterized in that the signalling software (SS) of the V5 interface (V5) comprises:
    means (11) for generating a parameter set containing at least one parameter controlling a given function in the signalling software;
    means (12) for storing the parameter set in conjunction with the signalling software (SS); and
    means (13) for selecting and activating a parameter set corresponding to the parameters of the V5 interface (V5) in question.

8. System as defined in claim 7, characterized in that the signalling software (SS) comprises means (14) for generating and activating a parameter set using the MML command language via the management network ($Q_{pc}$).

9. System as defined in claim 7, characterized in that the signalling software (SS) comprises means (15) for selecting the active parameter set from among parameter sets stored beforehand.

10. System as defined in claim 7, characterized in that the signalling software (SS) comprises means (26) for modifying a parameter set stored beforehand so as to make it consistent with the V5 interface (V5) in question.

11. System as defined in claim 7, characterized in that the signalling software (SS) comprises means (17) for generating parameter sets consistent with standard versions of V5 interfaces and for storing such parameter sets in conjunction with the signalling software.

12. System as defined in claim 7, characterized in that the signalling software (SS) comprises means (18) for naming each parameter set with an individual identifier.

* * * * *